United States Patent
Higuchi et al.

(10) Patent No.: US 8,575,287 B2
(45) Date of Patent: Nov. 5, 2013

(54) METHOD FOR PRODUCING POLYTETRAFLUOROETHYLENE FINE POWDER

(75) Inventors: Shinya Higuchi, Tokyo (JP); Yasuhiko Matsuoka, Tokyo (JP); Shigeki Kobayashi, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 314 days.

(21) Appl. No.: 12/910,904

(22) Filed: Oct. 25, 2010

(65) Prior Publication Data

US 2011/0040054 A1 Feb. 17, 2011

Related U.S. Application Data

(63) Continuation of application No. PCT/JP2009/057687, filed on Apr. 16, 2009.

(30) Foreign Application Priority Data

May 21, 2008 (JP) ................................. 2008-132657

(51) Int. Cl.
*C08F 14/18* (2006.01)

(52) U.S. Cl.
USPC ............................................ 526/250; 526/255

(58) Field of Classification Search
USPC .......................................................... 526/250
See application file for complete search history.

(56) References Cited

U.S. PATENT DOCUMENTS

| | | | | |
|---|---|---|---|---|
| 5,731,394 A | * | 3/1998 | Treat et al. ..................... | 526/247 |
| 6,060,167 A | * | 5/2000 | Morgan et al. ................. | 428/422 |
| 2002/0169265 A1 | * | 11/2002 | Kobayashi et al. ............. | 526/250 |
| 2003/0011958 A1 | | 1/2003 | Kolmschlag et al. | |
| 2003/0065115 A1 | | 4/2003 | Kobayashi et al. | |
| 2008/0200571 A1 | | 8/2008 | Higuchi et al. | |
| 2008/0200627 A1 | | 8/2008 | Funaki et al. | |
| 2008/0207859 A1 | | 8/2008 | Matsuoka et al. | |
| 2009/0176952 A1 | | 7/2009 | Funaki et al. | |
| 2011/0021728 A1 | | 1/2011 | Higuchi et al. | |

FOREIGN PATENT DOCUMENTS

| | | |
|---|---|---|
| CN | 101125900 A | 2/2008 |
| EP | 1 245 594 A1 | 10/2002 |
| EP | 1 291 367 A1 | 3/2003 |
| JP | 48-17546 | 3/1973 |
| JP | 52-43895 | 4/1977 |
| JP | 09-141734 | 6/1997 |
| JP | 10-147617 | 6/1998 |
| JP | 2009-029852 | 2/2009 |
| JP | 2009-029853 | 2/2009 |
| WO | 2007-046345 | 4/2007 |
| WO | 2007/046377 | 4/2007 |
| WO | 2007/049517 | 5/2007 |
| WO | WO 2008/032613 A1 | 3/2008 |
| WO | WO 2009/128432 A1 | 10/2009 |

OTHER PUBLICATIONS

U.S. Appl. No. 12/891,867, filed Sep. 28, 2010, Higuchi, et al.
Chinese Office Action issued Feb. 21, 2012, in China Patent Application No. 200980118471.X.
Chinese Office Action issued Feb. 21, 2012, in Chinese Patent Application No. 200980118471.X (English Translation).
Handbook of Fluororesins, p. 116-122, edited by Takaomi Satokawa, published by the Nikkan Kogyo Shimbun, Ltd., 1990.
International Search Report issued Jul. 14, 2009 in PCT/JP09/057687 filed Jul. 21, 2009.
Supplementary Search Report issued Mar. 28, 2011, in European Patent Application No. 09750442.7-1214 / 2287209.
Office Action issued Nov. 12, 2012 in Chinese Patent Application No. 200980118471.X with English language translation and Japanese translation.

* cited by examiner

*Primary Examiner* — Hui Chin
(74) *Attorney, Agent, or Firm* — Oblon, Spivak, McClelland, Maier & Neustadt, L.L.P.

(57) ABSTRACT

To provide a method for producing a PTFE fine powder having a low paste extrusion pressure property by a simple method. The method for producing a PTFE fine power comprises emulsion polymerizing tetrafluoroethylene in the presence of an aqueous medium, a fluorinated surfactant and a radical polymerization initiator, to produce an aqueous PTFE emulsion, and coagulating it in the presence of at least one bulk density-reducing compound selected from the group consisting of ammonia, an ammonium salt and urea in an amount of from 0.4 to 10 parts by mass per 100 parts by mass of PTFE.

10 Claims, No Drawings

METHOD FOR PRODUCING POLYTETRAFLUOROETHYLENE FINE POWDER

This application is a continuation of PCT/JP09/57687 filed Apr. 16, 2009. Priority to Japan 2008-132657 filed May 21, 2008, is claimed.

BACKGROUND ART

A polytetrafluoroethylene fine powder is produced by coagulating an aqueous emulsion of polytetrafluoroethylene (hereinafter referred to as PTFE) obtained by polymerization of tetrafluoroethylene (hereinafter referred to as TFE) in an aqueous medium by using an emulsifier, so-called an emulsion polymerization method, to prepare a polytetrafluoroethylene fine powder (hereinafter referred to as PTFE fine powder) in a wet state, and then drying it. Since the PTFE fine powder is likely to be fiberized when shearing force is applied, it is molded by a special method, and then used for various purposes.

As one of the molding methods of the PTFE fine powder, paste extrusion molding has been employed (for example, Non-Patent Document 1). That is, to the PTFE fine powder, a lubricant such as naphtha or a petroleum hydrocarbon having a dry point of at least 100° C. is added and uniformly impregnated to obtain a mixture. Then, the mixture is preliminary molded to a desired shape such as a tubular form to prevent fiberization of the PTFE fine powder and then charged to an extrusion cylinder and subjected to plastic deformation by a ram to obtain an extrusion molded product. Then, the extrusion molded product is heated in a drying oven to remove the lubricant by evaporation and sintered in a heating oven, whereby a desired molded material can be obtained. Otherwise, the extrusion molded product is subjected to rolling by rollers before the lubricant evaporates to obtain a sheet or a film, and then, after removal of the lubricant, the sheet or the film is subjected to stretching at a low stretching rate, to obtain an unsintered green tape. Further, by monoaxially or biaxially stretching the unsintered green tape at a high stretching rate at a high speed in a heated condition, a high strength porous film or sheet can be obtained.

Usually, with regard to the PTFE fine powder, the lower the extrusion pressure at the time of paste extrusion, the higher the productivity or yield of the product, and therefore the low extrusion pressure property is desired for the PTFE fine powder.

As a method to obtain a PTFE fine powder having a low extrusion pressure property, Patent Document 1 discloses applying radiation such as γ-ray to the PTFE fine powder.

Further, as a method to obtain a PTFE fine powder having a low extrusion pressure property, a method is known wherein the drying temperature is set at a low temperature during a drying step of the PTFE fine powder in a wet state which is obtained by coagulating an aqueous PTFE emulsion after emulsion polymerization. For example, Patent Document 2 discloses that an extrusion pressure as low as possible can be achieved in paste extrusion molding by conducting drying at a low temperature of from about 40° C. to about 80° C. Further, Patent Document 3 discloses the method to increase the content of a lubricant to be used at the time of paste extrusion.

PRIOR ART DOCUMENTS

Patent Documents

Patent Document 1: JP-A-48-17546
Patent Document 2: JP-A-52-43895
Patent Document 3: JP-A-9-141734
Non-Patent Document 1: Handbook of Fluororesins, p. 116-122, edited by Takaomi Satokawa, published by THE NIKKAN KOGYO SHIMBUN, LTD., 1990

DISCLOSURE OF THE INVENTION

Object to be Accomplished by the Invention

PTFE has had a problem such that, when it is exposed to radiation, its modular weight decreases and e.g. mechanical property of obtainable molded article deteriorates, and then its application is limited when radiation is applied to the PTFE fine powder as disclosed in the above Patent Document 1.

Further, there has been a problem such that if the drying temperature is set at a low temperature in the drying step of the PTFE fine powder in a wet state, the water content is likely to remain in the PTFE fine powder after drying, or the productivity decreases due to the increased drying time.

Further, if the content of the lubricant to be used at the time of paste extrusion is increased, the extrusion property tends to be unstable. Further, since the amount of the lubricant to be removed from the extrusion molded product before sintering increases, removal of the lubricant by vaporization tends to be insufficient, whereby the final molded article tends to be colored. Further, since a large amount of the lubricant has to be removed, there has been a problem such that the productivity significantly decreases.

An object of the present invention is to provide a method for producing a PTFE fine powder having a low paste extrusion pressure property by a simple method.

Means to Accomplish the Object

The present invention provides a method for producing a PTFE fine powder having the following constructions.

[1] A method for producing a PTFE fine powder, which comprises emulsion polymerizing TFE in the presence of an aqueous medium, a fluorinated surfactant and a radical polymerization initiator, to produce an aqueous PTFE emulsion, and coagulating it in the presence of at least one bulk density-reducing compound selected from the group consisting of ammonia, an ammonium salt and urea in an amount of from 0.4 to 10 parts by mass per 100 parts by mass of PTFE.

[2] The method for producing a PTFE fine powder according to the above [1], wherein the aqueous medium is water.

[3] The method for producing a PTFE fine powder according to the above [1] or [2], wherein the radical polymerization initiator is at least one member selected from the group consisting of a water-soluble radical initiator, a water-soluble oxidation-reduction catalyst or an oil-soluble radical polymerization initiator.

[4] The method for producing a PTFE fine powder according to any one of the above [1] to [3], wherein the bulk density-reducing compound is ammonium carbonate.

[5] The method for producing a PTFE fine powder according to any one of the above [1] to [4], wherein the fluorinated surfactant is at least one member selected from the group consisting of a fluorinated carboxylic acid having from 1 to 4 etheric oxygen atoms in the molecule and salts thereof, a perfluoroalkylcarboxylic acid and salts thereof, a ω-hydroperfluoroalkylcarboxylic acid and salts thereof, and a fluorinated sulfonic acid and salts thereof.

[6] The method for producing a PTFE fine powder according to the above [5], wherein the number of carbon atoms constituting the fluorinated surfactant is from 4 to 10.

[7] The method for producing a PTFE fine powder according to any one of the above [1] to [6], wherein the amounts of the aqueous medium, the fluorinated surfactant and the radical polymerization initiator to be used for the emulsion polymerization are from 120 to 900 parts by mass, from 0.15 to 2.0 parts by mass and from 0.01 to 0.20 parts by mass, per 100 parts by mass of PTFE, respectively.

[8] The method for producing a PTFE fine powder according to any one of the above [1] to [7], wherein the amount of the bulk density-reducing compound is from 0.5 to 9 parts by mass per 100 parts by mass of PTFE.

[9] The method for producing a PTFE fine powder according to any one of the above [1] to [8], wherein conditions for the emulsion polymerization are such that the polymerization temperature is from 10 to 95° C., the polymerization pressure (gauge pressure) is from 0.5 to 4.0 MPa and the polymerization time is from 90 to 520 minutes.

[10] A PTFE fine powder produced by the method as defined in any one of the above

[1] to [9], which has a standard specific gravity of from 2.140 to 2.180 and a paste extrusion pressure of from 10 to 25 MPa.

Effects of the Invention

By the PTFE fine powder production method of the present invention, the aqueous PTFE emulsion is coagulated by stirring it in the presence of at least one compound selected from the group consisting of ammonia, an ammonium salt and urea in a amount of from 0.4 to 10 parts by mass per 100 parts by mass of PTFE, whereby it is possible to impart a state of high specific surface area to inside of the PTFE fine powder after drying and reduce its bulk density. For this reason, it is possible to obtain a PTFE fine powder having a low paste extrusion pressure property, and a desired molded article can be molded productively by a low paste extrusion pressure. Further, the PTFE fine powder production method of the present invention is industrially useful since it has a high productivity and does not require investment for a special facility.

BEST MODE FOR CARRYING OUT THE INVENTION

The aqueous PTFE emulsion (hereinafter referred to as PTFE emulsion) of the PTFE fine powder production method of the present invention is produced by emulsion polymerizing TFE in the presence of an aqueous medium, a fluorinated surfactant and a radical polymerization initiator.

The aqueous medium used for production of PTFE emulsion is preferably water. The amount of the aqueous medium to be used is preferably from 120 to 900 parts by mass, more preferably from 150 to 400 parts by mass, per 100 parts by mass of PTFE.

The radical polymerization initiator used for production of the PTFE emulsion may, for example, be a water-soluble radical initiator, a water soluble oxidation-reduction catalyst or an oil-soluble radical polymerization initiator. Among them, the water-soluble radical initiator or water-soluble oxidation-reduction catalyst is preferred.

The water-soluble radical initiator is preferably a persulfate such as ammonium persulfate or potassium persulfate, or a water soluble organic peroxide such as disuccinic acid peroxide, bisglutaric acid peroxide or tert-butyl hydroperoxide.

The water-soluble oxidation-reduction catalyst is preferably a combination of an oxidizing agent such as bromic acid or salts thereof, chloric acid or salts thereof, persulfuric acid or salts thereof, permanganic acid or salt thereof, or hydrogen peroxide, and a reducing agent such as sulfurous acid or salts thereof, hydrogen sulfurous acid or salts thereof, thiosulfuric acid or salts thereof, or an organic acid.

Such radical polymerization initiators may be used alone or in combination as a mixture of two or more of them. The radical polymerization initiator is more preferably disuccinic acid peroxide.

The amount of the radical polymerization initiator to be used is preferably from 0.01 to 0.20 mass %, more preferably from 0.01 to 0.15 mass %, based on the final yield of PTFE.

In emulsion polymerization of TFE, a fluorinated surfactant is usually used since it does not hinder the polymerization reaction of TFE by chain transfer in an aqueous medium.

The amount of the fluorinated surfactant to be used in the present invention is preferably from 0.15 to 2.0 parts by mass, more preferably from 0.20 to 2.0 parts by mass, per 100 parts by mass of PTFE.

The fluorinated surfactant is more preferably at least one member selected from the group consisting of a fluorinated carboxylic acid having from 1 to 4 etheric oxygen atoms in the molecule and salts thereof, a perfluoroalkylcarboxylic acid and salts thereof, a ω-hydroperfluoroalkylcarboxylic acid and salts thereof, and a fluorinated sulfonic acid and salts thereof. When the number of etheric oxygen atoms is in the above range, the polymerization stability becomes excellent and the bioaccumulation potential becomes low. The number of etheric oxygen atoms in the molecule is preferably from 2 to 4.

The number of carbon atoms constituting the fluorinated surfactant is preferably from 4 to 10, more preferably from 4 to 8, most preferably from 4 to 7. When the number of carbon atoms in the fluorinated surfactant is in the above range, the polymerization stability becomes excellent and the bioaccumulation potential becomes low.

The fluorinated carboxylic acid having from 1 to 4 etheric oxygen atoms in the molecule may, for example, be $C_3F_7OCF_2CF_2OCF_2COOH$, $C_4F_9OCF_2CF_2OCF_2COOH$, $C_5F_{11}OCF_2CF_2OCF_2COOH$, $C_6F_{13}OCF_2CF_2OCF_2COOH$, $CF_3O(CF_2CF_2O)_2CF_2COOH$, $C_3F_7O(CF_2CF_2O)_2CF_2COOH$, $C_4F_9O(CF_2CF_2O)_2CF_2COOH$ $C_5F_{11}O(CF_2CF_2O)_2CF_2COOH$, $C_6F_{13}O(CF_2CF_2O)_2CF_2COOH$, $C_3F_7O(CF_2CF_2O)_3CF_2COOH$, $C_4F_9O(CF_2CF_2O)_3CF_2COOH$, $C_5F_{11}O(CF_2CF_2O)_3CF_2COOH$, $C_6F_{13}O(CF_2CF_2O)_3CF_2COOH$, $C_4F_9OCF_2CF_2OCF_2CF_2OCF_2COOH$, $C_2F_5OCF_2CF_2OCF_2CF_2OCF_2COOH$, $C_3F_7OCF(CF_3)CF_2OCHFCOOH$, $CF_3OCF_2OCF_2OCF_2OCF_2COOH$, $CF_3OCF_2OCF_2OCF_2OCF_2OCF_2COOH$, $CF_3CF_2O(CF_2)_5COOH$, $CF_3CFHO(CF_2)_5COOH$, $CF_3OCF_2(CF_3)CF_2OCF(CF_3)COOH$, $CF_3OC_3F_6OCF(CF_3)COOH$, $CF_3O(CF_2)_3OCHFCF_2COOH$, $C_4F_9OCF(CF_3)COOH$, $C_4F_9OCF_2CF_2COOH$, $CF_3OCF_2CF_2CF_2OCF_2COOH$, $C_2F_5OCF_2CF_2OCF_2COOH$, $CF_3O(CF_2)_3OCHFCOOH$, $CF_3OCF_2OCF_2OCF_2COOH$, $C_4F_9OCF_2COOH$, $C_3F_7OCF_2CF_2COOH$, $C_3F_7OCHFCF_2COOH$, $CF_3CFHO(CF_2)_3COOH$, $CF_3OCF_2CF_2OCF_2COOH$, $C_2F_5OCF_2CF_2COOH$, $C_3F_7OCHFCOOH$, $CF_3OCF_2CF_3COOH$, $CF_3O(CF_2O)_2COOH$ or $CF_3O(CF_2O)_3COOH$. Further, salts of the fluorinated carboxylic acid having from 1 to 4 etheric oxygen atoms in the molecule may, for example, be Li, Na, K or $NH_4$ salts of the above compounds.

Specific examples of the perfluoroalkylcarboxylic acid may, for example, be perfluorohexanoic acid, perfluoroheptanoic acid, perfluorooctanoic acid and perfluorononanoic acid. Further, salts of the perfluoroalkylcarboxylic acid may, for example, be Li, Na, K or $NH_4$ salts of the above compounds.

Specific examples of the ω-hydroperfluoroalkylcarboxylic acid may, for example, be ω-hydroperfluorohexanoic acid, ω-hydroperfluoroheptanoic acid, ω-hydroperfluorooctanoic acid and ω-hydroperfluorononanoic acid. Further, salts of the ω-hydroperfluoroalkylcarboxylic acid may, for example, be Li, Na, K or $NH_4$ salts of the above compounds.

The fluorinated sulfonic acid may, for example, be perfluorooctane sulfonic acid or $C_6F_{13}CH_2CH_2SO_3H$. Further, salts of the fluorinated sulfonic acid may, for example, be Li, Na, K or $NH_4$ salts of the above compounds.

The fluorinated surfactant is more preferably perfluorohexanoic acid, perfluoroheptanoic acid, perfluorooctanoic acid, ω-hydroperfluorooctanoic acid, $C_3F_7OCF_2CF_2OCF_2COOH$, $C_4F_9OCF_2CF_2OCF_2COOH$, $C_2F_5OCF_2CF_2OCF_2CF_2OCF_2COOH$, $C_3F_7OCF(CF_3)CF_2OCHFCOOH$, $CF_3OCF_2OCF_2OCF_2OCF_2COOH$, $CF_3O(CF_2CF_2O)_2CF_2COOH$, $CF_3CF_2O(CF_2)_5COOH$, $CF_3CFHO(CF_2)_5COOH$, $CF_3OCF(CF_3)CF_2OCF(CF_3)COOH$, $CF_3OC_3F_6OCF(CF_3)COOH$, $CF_3O(CF_2)_3OCHFCF_2COOH$, $C_4F_9OCF(CF_3)COOH$, $C_4F_9OCF_2CF_2COOH$, $CF_3OCF_2CF_2CF_2OCF_2COOH$, $C_2F_5OCF_2CF_2OCF_2COOH$, $CF_3O(CF_2)_3OCHFCOOH$, $CF_3OCF_2OCF_2OCF_2COOH$, $C_4F_9OCF_2COOH$, $C_3F_7OCF_2CF_2COOH$, $C_3F_7OCHFCF_2COOH$, $CF_3CFHO(CF_2)_3COOH$, $CF_3OCF_2CF_2OCF_2COOH$, $C_2F_5OCF_2CF_2COOH$, $C_3F_7OCHFCOOH$, $CF_3OCF_2CF_2COOH$ or a fluorinated sulfonic acid, or salts thereof.

Further preferably, perfluorohexanoic acid, perfluoroheptanoic acid, $C_4F_9OCF(CF_3)COOH$, $C_4F_9OCF_2CF_2COOH$, $CF_3OCF_2CF_2CF_2OCF_2COOH$, $C_2F_5OCF_2CF_2OCF_2COOH$, $CF_3OCF_2OCF_2OCF_2COOH$, $C_4F_9OCF_2COOH$, $C_3F_7OCF_2CF_2COOH$, $CF_3OCF_2CF_2OCF_2COOH$ or $C_2F_5OCF_2CF_2COOH$, or salts thereof may be mentioned.

Most preferably, perfluorohexanoic acid, $C_2F_5OC_2F_4OCF_2COOH$, $CF_3OC_2F_4OCF_2COOH$ or $C_4F_9OCF_2COOH$, or salts thereof may be mentioned.

Further, the fluorinated surfactant is particularly preferably an ammonium salt ($NH_4$) of such a compound. The ammonium salt has good solubility in an aqueous medium and no metal iron component will remain in the PTFE fine powder as an impurity.

In the present invention, the PTFE emulsion is preferably produced by emulsion polymerization of TFE in the presence of a stabilizing agent in addition to the aqueous medium, the fluorinated surfactant and the radical polymerization initiator.

The stabilizing agent is preferably paraffin wax, a fluorine-based oil, a fluorine-based solvent or silicone oil. Such stabilizing agents may be used alone or in a combination as a mixture of two or more of them. As the stabilizing agent, paraffin wax is more preferred. Paraffin wax may be liquid, semisolid or solid at room temperature, and a saturated hydrocarbon having at least 12 carbon atoms, is preferred. The melting point of the paraffin wax is usually preferably from 40 to 65° C., more preferably from 50 to 65° C. The amount of the stabilizing agent to be used is preferably from 0.1 to 12 mass %, more preferably from 0.1 to 8 mass %, based on the mass of the aqueous medium to be used.

In the present invention, in the emulsion polymerization of TFE, a homopolymer of TFE (PTFE) may be obtained by homopolymerization of TFE. In addition, TFE may be copolymerized with another monomer which can be copolymerized with TFE (hereinafter referred to as a comonomer) to such an extent that does not provide melt-moldability, to obtain a copolymer of TFE with the comonomer (hereinafter referred to as modified PTFE).

The content of constituting units based on the comonomer in the modified PTFE is preferably at most 0.5 mass %, more preferably at most 0.4 mass %, based on the total constituting units. If the content exceeds 0.5 mass %, meltability will be imparted, and the modified PTFE is likely to become unsuitable for a heat resistance use. The above comonomer to be used for polymerization of the modified PTFE may, for example, be hexafluoropropylene, a perfluoro(alkyl vinyl ether), chlorotrifluoroethylene, a (perfluoroalkyl)ethylene, vinylidene fluoride, vinyl fluoride, a perfluoro(alkenyl vinyl ether), perfluoro(2,2-dimethyl-1,3-dioxole) or a perfluoro(4-alkoxy-1,3-dioxole). Such comonomers may be used alone or in a combination as a mixture of two or more of them.

The perfluoro(alkyl vinyl ether) may, for example, be perfluoro(methyl vinyl ether), perfluoro(ethyl vinyl ether), perfluoro(propyl vinyl ether), perfluoro(butyl vinyl ether), perfluoro(ethoxy ethyl vinyl ether), perfluoro(propoxy propyl vinyl ether) or perfluoro(tetrahydrofurfuryl vinyl ether).

The perfluoro(alkenyl vinyl ether) may, for example, be perfluoro(allyl vinyl ether) or perfluoro(butenyl vinyl ether).

As conditions for the emulsion polymerization of TFE, the polymerization temperature is preferably from 10 to 95° C., more preferably from 15 to 90° C. The polymerization pressure (gauge pressure) is preferably from 0.5 to 4.0 MPa, more preferably from 0.6 to 3.5 MPa. The polymerization time is preferably from 90 to 520 minutes, more preferably from 90 to 450 minutes.

The PTFE emulsion obtained by emulsion polymerization of TFE has a PTFE concentration of preferably from 10 to 45 mass %, more preferably from 15 to 45 mass %, particularly preferably from 20 to 40 mass %. If the PTFE concentration is too low, it will be difficult to coagulate the primary particles of PTFE. If the PTFE concentration is too high, the non-coagulated primary particles of PTFE will remain, and the liquid from coagulation will be turbid. When the PTFE concentration is within the above range, it is easy to coagulate the primary particles of PTFE, whereby it becomes possible to make the primary particle size of PTFE to be in a range of from 0.19 to 0.40 µm. Here, the primary particle size is a median size measured by a laser scattering particle size distribution analyzer.

Then, the PTFE emulsion is coagulated to separate a PTFE fine powder in a wet state (hereinafter referred to as undried PTFE fine powder) from the PTFE emulsion.

As an undried PTFE fine powder separation method, a known method may be used. For example, the PTFE emulsion is diluted with water to adjust the PTFE concentration to from 8 to 20 mass %, followed by vigorous stirring to coagulate the primary particles of PTFE. Then, it is stirred properly to separate the PTFE fine powder having its primary particles coagulated from the aqueous medium, followed by agglomeration, particle size regulation to obtain a PTFE fine powder in a wet state.

When coagulating the primary particles, as the case requires, the pH of the PTFE emulsion may be adjusted.

Here, in the present specification, agglomeration is a step of growing PTFE particles to several hundred µm after coagulation of PTFE emulsion, and particle size regulation is a step in which a particle property and a particle size distribution are regulated by continuous stirring.

The present invention is characterized in that the PTFE emulsion is coagulated in the presence of at least one bulk density-reducing compound selected from the group consisting of ammonia, an ammonium salt and urea. If coagulation of the PTFE emulsion is conducted in the presence of such bulk density-reducing compounds, it is possible to reduce the paste extrusion pressure of the finally obtainable PTFE fine powder. Although the reason for this is not clearly understood, since the bulk density of the obtainable PTFE fine powder after drying becomes low in a case where coagulation is conducted in the presence of the bulk density-reducing compound comparing to the case where coagulation is conducted without the presence of the bulk density-reducing compound, it is considered that the PTFE fine powder is in a state of high specific surface area and uniform distribution of the lubricant at the time of paste extrusion is promoted.

Further, it is considered that the above bulk density-reducing compound is decomposed at the time of drying, does not remain in the PTFE powder after drying and does not confer an adverse effect on paste extrusion, due to its relatively low decomposition temperature.

In the present invention, the above bulk density-reducing compound may be added to the PTFE emulsion as it is or as an aqueous solution. Further, it may be added to the PTFE emulsion at any time before generation of hydrophobic PTFE. That is, it may be added before coagulating the PTFE emulsion by stirring and shearing, or after stirring and shearing are initiated.

In the present invention, the above ammonium salt which is used as the bulk density-reducing compound is preferably ammonium carbonate or ammonium hydrogencarbonate. Since they are decomposed at the time of drying and do not remain in the PTFE fine powder, the PTFE fine powder after drying does not change its color by residues, and its paste extrusion property will not be adversely affected. Further, the solubility of ammonium carbonate is 55.8 g/100 g water (0° C.), and the solubility of ammonium hydrogencarbonate is 24.8 g/100 g water (25° C.), whereby both of them have a good solubility in water and good handling efficiency, such being preferred. Further, since urea is not decomposed to ammonia unless heated to about at least 130° C., it is preferred to use ammonia or an ammonium salt as the bulk density-reducing compound when the undried PTFE fine powder is dried at a low temperature.

Further, to reduce burden of a PTFE remnant remained in an aqueous medium (i.e. coagulation waste liquid) in which the PTFE fine powder is separated after coagulation in the subsequent treatment step of the coagulation waste liquid, a coagulating agent such as an ammonium salt may be added to the PTFE emulsion to coagulate the PTFE emulsion. The amount of the coagulating agent to be used may be an amount by which the residual solid content of PTFE in the coagulation waste liquid becomes less than 0.1 mass %. For example, the amount of less than 0.4 parts by mass per 100 parts by mass of PTFE is sufficient when an ammonium salt is used as the coagulating agent. Particularly, when a nitrogen compound such as an ammonium salt is used as the coagulating agent, a nitrogen concentration in the coagulation waste liquid increases, whereby a waste water quality standard is likely to be unsatisfied. Therefore, from the viewpoint of labor hour, cost etc. of waste water treatment, when an ammonium salt is used as the coagulating agent, it is preferred to suppress the amount to be used to an extremely low amount.

On the other hand, in the present invention, the amount of the bulk density-reducing compound to be added is an optimal amount for reducing burden of a PTFE remnant remained in the coagulation waste liquid in the subsequent treatment step of the coagulation waste liquid, at the time of coagulating the PTFE emulsion in which solid content concentration of PTFE is adjusted to a certain amount, by stirring and shearing. That is, in the present invention, by using the bulk density-reducing compound in an amount of larger than the amount of the coagulating agent, a significant effect is obtained.

In the present invention, the amount of the bulk density-reducing compound to be used is from 0.4 to 10 parts by mass, more preferably from 0.5 to 9 parts by mass, further preferably from 0.5 to 5 parts by mass, per 100 parts by mass of PTFE. When the amount of the bulk density-reducing compound to be used is less than 0.4 parts by mass, no substantial effect is observed, whereby the paste extrusion pressure of the PTFE fine powder after drying can hardly be substantially reduced. Further, even if the amount of the bulk density-reducing compound to be used exceeds 10 parts by mass, the above-mentioned effects are hardly increased substantially and labor hour and cost for waste water treatment are likely to be increased by increase in a nitrogen concentration in the waste water, and therefore upper limit of 10 parts by mass is preferred. Accordingly, in the present invention, the amount of the bulk density-reducing compound to be used is an optimal amount for reducing burden of the PTFE remnant remained in the coagulation waste liquid in the subsequent treatment step of the coagulation waste liquid, at the time of coagulating the PTFE emulsion in which solid content concentration of PTFE is adjusted to a certain amount, by stirring and shearing. That is, it is used in an amount larger than the amount of the coagulating agent. Further, a fluorinated surfactant is contained in the coagulation waste liquid, and the fluorinated surfactant in the aqueous medium can be recovered by using a method of adsorbing it by an ion exchange resin, a concentrating method such as evaporation of water content, or adsorption with activated carbon.

In the PTFE fine powder production method of the present invention, next, the undried PTFE fine powder separated from the PTFE emulsion is dried. The drying temperature of the undried PTFE fine powder is preferably from 110 to 250° C., more preferably from 120 to 230° C. When the drying temperature is less than 110° C., not only the drying time becomes longer, but also removal of the water content is likely to be insufficient. When the drying temperature becomes 250° C. or higher, improvement of the paste extrusion pressure property is likely to become impossible.

The drying of the undried PTFE fine powder is preferably conducted in such a state that the undried PTFE fine powder will not substantially flow, preferably in a state that it will be left to stand still. At that time, it is also preferred to dry it by using vacuum, a high frequency wave, hot air or the like.

Further, when the undried PTFE fine powder has adsorbed a fluorinated surfactant which sublimes during drying, the adsorbed fluorinated surfactant can be recovered by introducing an air discharged during drying, to an alkali aqueous solution (e.g. concentrated potassium carbonate aqueous solution).

The standard specific gravity of the PTFE fine powder produced by the production method of the present invention is preferably from 2.140 to 2.180, more preferably from 2.140 to 2.170, particularly preferably from 2.140 to 2.160. The standard specific gravity is used as a relative scale of the molecular weight, and the lower the value, the higher the molecular weight.

Usually, the PTFE fine powder having a large molecular weight is likely to have a high paste extrusion pressure.

The PTFE fine powder obtained by the production method of the present invention can be molded by a low paste extrusion pressure, and therefore, the higher the molecular weight, i.e. the smaller the standard specific gravity, the higher the efficiency.

The paste extrusion pressure of the PTFE fine powder produced by the production method of the present invention is from 10 to 25 MPa, preferably from 12 to 20 MPa. Such a PTFE fine powder can be molded by a low paste extrusion pressure, and it is possible to produce a desired molded article with good productivity.

As the paste extrusion molding method of the PTFE fine powder, a known conventional method can be employed. For example, a method may be mentioned in which a lubricant is mixed with the PTFE fine powder to impart flowability to the PTFE fine powder, and then paste extrusion molding is conducted to obtain a desired shape. The mixing ratio of the lubricant may be set properly to let the PTFE fine powder have flowability. The mixing ratio is usually from 15 to 30 parts by mass, more preferably from 20 to 25 parts by mass, per 100 parts by mass of the PTFE fine powder.

As the lubricant, it is preferred to use naphtha or a petroleum hydrocarbon having a dry point of at least 100° C.

Further, to the PTFE fine powder produced by the production of the present invention, an additive such as a pigment for coloring or various fillers for imparting strength and electric conductivity, may be added.

The shape of the paste extrusion molded product of the PTFE fine powder may be various such as a tube-shape, a sheet-shape, a film-shape or a fiber-shape. Its application may, for example, be tubes, wire coatings, sealing materials, porous membranes or filters.

Further, the paste extrusion molded product of the PTFE fine powder may be stretched further to obtain a PTFE porous material. As the conditions for the stretching, a proper speed of e.g. from 5 to 1,000%/second and a proper stretching rate of e.g. at least 500%, may be used. The porosity of the PTFE porous material is not particularly limited, but the porosity is usually preferably in a range of from 50 to 99%, particularly preferably from 70 to 98%. An article constituted by the porous material may be in various shapes e.g. a tube-shape, a sheet-shape, a film-shape or a fiber-shape.

Here, the porosity means a ratio of a porous volume to the total volume.

EXAMPLES

Now, the present invention will be described in further detail with reference to Examples and Comparative Examples, but it should be understood that the present invention is by no means restricted thereto.

Methods for measuring characteristics of the PTFE fine powder are as follows.

Further, the following pressure (MPa) means a gauge pressure.

(A) Average primary particle size (unit: μm) of PTFE obtained by emulsion polymerization: The median size was measured by using a laser scattering particle size distribution analyzer (tradename: "LA-920", manufactured by Horiba, Ltd.)

(B) Residual solid content of polymer: The PTFE emulsion was stirred and sheared to coagulate, and then the coagulation waste liquid was sampled and collected about 10 g to a glass petri dish, followed by drying at 120° C. for 2 hours. Then, the mass of residues was divided by the amount sampled to the glass petri dish to calculate the ratio of residual solid content of polymer.

(C) Average particle size of PTFE fine powder (unit: μm): Measured in accordance with JIS K6891. 20, 30, 40, 45 and 60 mesh standard sieves were piled in this order from the top, and then the powder was put on the 20 mesh sieve and sieved to calculate the mass of PTFE powder remained on each sieve. The 50% particle size calculated by a logarithmic probability paper based on the above mass, is designated as the average particle size.

(D) Bulk density (unit: g/ml): Measured in accordance with JIS K6891. Into a stainless steel weighing bottle with an inner volume of 100 mL, a sample was dropped from a funnel set above, and a part of the sample bulging from the weighing bottle was scraped off with a flat plate. Thereafter, the weight of the sample remaining in the weighing bottle was measured, and a value obtained by dividing the weight of the sample by the inner volume of the weighing bottle was taken as the apparent density.

(E) Standard specific gravity (hereinafter referred to as SSG): Measured in accordance with ASTM D1457-91a and ASTM D4895-91a. That is, 12.0 g of PTFE was weighed and kept in a cylindrical die with an inner diameter of 28.6 mm under a pressure of 34.5 MPa for 2 minutes. Then, it was put into an oven at 290° C., and the temperature was raised at a rate of 120° C./hr. It was kept at 380° C. for 30 minutes, then the temperature was lowered at a rate of 60° C./hr, and it was kept at 294° C. for 24 minutes. Then, it was kept in a desiccator at 23° C. for 12 hours. Thereafter, the specific gravity of the molded product at 23° C. to water was measured and taken as the standard specific gravity.

(F) Evaluation for extrusion pressure: The PTFE fine powder (100 g) which was left at room temperature for more than 2 hours, was put into a glass bottle having an internal capacity of 900 mL, and 21.7 g of Isopar H (registered trademark, manufactured by EXXON Corporation) was added as a lubricant, followed by mixing for 3 minutes to obtain a PTFE mixture. The obtained PTFE mixture was left in a constant temperature chamber at 25° C. for 2 hours, and extruded through an orifice having a diameter of 2.5 cm, a land length of 1.1 cm and an introduction angle of 30°, at 25° C. under conditions of a reduction ratio (ratio of the cross-section of the inlet to the cross section of the outlet of the die) of 100 and an extrusion ratio of 51 cm/min, and then subjected to paste extrusion to obtain a beading. The pressure required for the extrusion at that time was measured, and it was designated as the extrusion pressure (MPa).

(G) Measurement of mechanical strength of PTFE compression molded product: Measured in accordance with ASTM D4895-98 and ASTM D1708. 14.5 g of the PTFE fine powder was weighed and kept in a cylindrical die having an inner diameter of 76 mm under a pressure of 13.7 MPa for 3 minutes. It was put into an oven at 290° C., and the temperature was raised at a rate of 120° C./hr. It was kept at 380° C. for 30 minutes, then cooled at a rate of 60° C./hr and kept at 300° C. for 30 minutes. Then, it was punched by a micro dumbbell cutter (MK-1229; manufactured by Dumbbell Co., Ltd.) and then subjected for testing by a jaws gap of 22.25 mm and a pulling rate of 50 mm/min. The tensile strength of the above two sheets was measured at five points, and then the average values of strength (MPa) and elongation (%) were calculated.

Example 1

Into a 100 L stainless steel autoclave equipped with a baffle plate and a stirrer, 35 g of ammonium perfluorooctanoate (hereinafter referred to as APFO), 872 g of paraffin wax and 59 liters of deionized water were charged. The air in the autoclave was replaced with nitrogen, and then pressure was reduced, and the pressure was increased by adding TFE, and the temperature was raised to 70° C. with stirring. Then, the pressure was raised to 1.765 MPa by adding TFE, and 5.0 g of disuccinic acid peroxide (concentration: 80 mass %, the rest being water) as dissolved in 1 liter of warm water at about 70° C., was injected into the autoclave. The inner pressure decreased to 1.746 MPa in about 3 minutes.

Polymerization was proceeded by adding TFE to keep the inner pressure of the autoclave at 1.765 MPa. APFO was dissolved in warm water, and the total of 63 g as APFO was added during the polymerization. Further, ammonium sulfite was dissolved in water, and the total of 4 g as ammonium sulfite was added during the polymerization. The temperature was lowered to 64° C. in a half way, and it was raised to 80° C. at the end of the polymerization. The reaction was terminated at a point where the amount of TFE added reached 23 kg, and TFE in the autoclave was released into the atmosphere. The polymerization time was 173 minutes. The obtained PTFE emulsion was cooled, and the supernatant paraffin wax was removed. The solid content concentration of the PTFE emulsion was about 26 mass %. The APFO used was 4,122 ppm based on the final yield of PTFE. Further, the average primary particle size was 0.25 µm. The amount of coagulated material present in the reactor was just about a trace.

The PTFE emulsion was adjusted and diluted with pure water to a concentration of 10 mass %, and 7.3 kg of the diluted aqueous emulsion was charged into a 8 L coagulation vessel equipped with a stirring blade, and the internal temperature of the vessel was adjusted to 20° C. Then, 110 g of a 20 mass % ammonium carbonate aqueous solution was introduced, followed by stirring at 427 rpm for coagulation to obtain an undried PTFE fine powder (the amount of ammonium carbonate was 3 parts by mass per 100 parts by mass of PTFE). The residual solid content of PTFE in the coagulation waste liquid was less than 0.1 mass %. The obtained undried PTFE fine powder was dried at 180° C. for 5 hours to produce the PTFE fine powder. The average particle size, the bulk density and the standard specific gravity (SSG) of the obtained PTFE fine powder were found to be 410 µm, 0.46 g/ml and 2.150, respectively. Further, a paste extruded beading was obtained by the measuring method (F), and its extrusion pressure was found to be 16.3 MPa. Further, the tensile strength was measured by the measuring method (G), and its strength and elongation were found to be 43 MPa and 430%, respectively.

Example 2

A PTFE fine powder was produced in the same manner as in Example 1 except that the undried PTFE fine powder was dried at 150° C. for 6.5 hours. The obtained PTFE fine powder was subjected to the measuring method (F) to obtain a paste extruded beading, and its extrusion pressure was found to be 14.8 MPa.

Example 3

A PTFE fine powder was produced in the same manner as in Example 1 except that the undried PTFE fine powder was dried at 120° C. for 8 hours. The obtained PTFE fine powder was subjected to the measuring method (F) to obtain a paste extruded beading, and its extrusion pressure was found to be 12.7 MPa.

Comparative Example 1

A PTFE fine powder was produced in the same manner as in Example 1 except that the PTFE emulsion was coagulated without adding ammonium carbonate. The residual solid content of PTFE in the coagulation waste liquid was 0.4 mass %. Further, the average particle size and the bulk density of the obtained PTFE fine powder were 440 µm and 0.50 g/ml, respectively. The standard specific gravity was 2.150. Further, a paste extruded beading was obtained by the measuring method (F), and its extrusion pressure was found to be 18.1 MPa. Comparing to Example 1, the extrusion pressure was higher by 1.8 MPa. Further, the tensile strength was measured by the measuring method (G), and its strength and elongation were found to be 39 MPa and 400%, respectively.

Comparative Example 2

A PTFE fine powder was produced in the same manner as in Example 2 except that the PTFE emulsion was coagulated without adding ammonium carbonate. The obtained PTFE fine powder was subjected to the measuring method (F), and then a paste extruded beading was obtained. Its extrusion pressure was found to be 16.3 MPa. Comparing to Example 2, its extrusion pressure was higher by 1.5 MPa.

Comparative Example 3

A PTFE fine powder was produced in the same manner as in Example 3 except that the PTFE emulsion was coagulated without adding ammonium carbonate. The obtained PTFE fine powder was subjected to the measuring method (F), and then a paste extruded beading was obtained. Its extrusion pressure was found to be 13.2 MPa. Comparing to Example 3, its extrusion pressure was higher by 0.5 MPa.

Example 4

A PTFE fine powder was produced in the same manner as in Example 1 except that the PTFE emulsion was coagulated by introducing 18.3 g of a 20 mass % ammonium carbonate aqueous solution (the amount of ammonium carbonate was 0.5 parts by mass per 100 parts by mass of PTFE). The residual solid content of PTFE in the coagulation waste liquid was less than 0.1 mass %. Further, the average particle size and the bulk density of the obtained PTFE fine powder were 430 µm and 0.48 g/ml, respectively. Further, a paste extruded beading was obtained by the measuring method (F), and its extrusion pressure was found to be 16.5 MPa.

Example 5

A PTFE fine powder was produced in the same manner as in Example 1 except that the PTFE emulsion was coagulated by introducing 36.5 g of a 20 mass % ammonium carbonate aqueous solution (the amount of ammonium carbonate was 1 part by mass per 100 parts by mass of PTFE). The residual solid content of PTFE in the coagulation waste liquid was less than 0.1 mass %. Further, the average particle size and the bulk density of the obtained PTFE fine powder were 450 µm and 0.46 g/ml, respectively. Further, a paste extruded beading was obtained by the measuring method (F), and its extrusion pressure was found to be 16.4 MPa. Although the amount of ammonium carbonate was reduced to a level of ⅓, the effect of reducing extrusion pressure was observed.

Example 6

A PTFE fine powder was produced in the same manner as in Example 1 except that the PTFE emulsion was coagulated by introducing 328.5 g of a 20 mass % ammonium carbonate aqueous solution (the amount of ammonium carbonate was 9 parts by mass per 100 parts by mass of PTFE). The obtained PTFE fine powder was subjected to the measuring method (F) to obtain a paste extruded beading, and its extrusion pressure was found to be 16.2 MPa.

Example 7

Into a 100 L stainless steel autoclave equipped with a baffle plate and a stirrer, 70 g of a $C_2F_5OC_2F_4OCF_2COONH_4$ (Ammonium perfluoro-3,6-dioxaoctanoate, hereinafter referred to as APFDO), 872 g of paraffin wax and 59 liters of deionized water were charged. The air in the autoclave was replaced with nitrogen, and then the pressure was reduced, and the pressure was increased by adding TFE, and the temperature was raised to 70° C. with stirring. Then, the pressure was raised to 1.765 MPa by adding TFE, and 5.0 g of disuccinic acid peroxide (concentration: 80 mass %, the rest being water) as dissolved in 1 liter of warm water at about 70° C., was injected into the autoclave. The inner pressure decreased to 1.746 MPa in about 3 minutes.

Polymerization was proceeded by adding TFE to keep the inner pressure of the autoclave at 1.765 MPa. APFDO was dissolved in warm water, and the total of 125 g as APFDO was added during the polymerization. Further, ammonium sulfite was dissolved in water, and the total of 4 g as ammonium sulfite was added during the polymerization. The temperature was lowered to 64° C. in a half way, and it was raised to 80° C. at the end of the polymerization. The reaction was terminated at a point where the amount of TFE added reached 23 kg, and TFE in the autoclave was released into the atmosphere. The polymerization time was 176 minutes. The obtained PTFE emulsion was cooled, and the supernatant paraffin wax was removed. The solid content concentration of the PTFE emulsion was about 26 mass %. The APFDO used was 8,333 ppm based on the final yield of PTFE. Further, the average primary particle size was 0.28 μm. The amount of coagulated material present in the reactor was just about a trace.

The PTFE emulsion was adjusted and diluted with pure water to a concentration of 10 mass %, and 7.3 kg of the diluted aqueous emulsion was charged into a 8 L coagulation vessel equipped with a stirring blade, and the internal temperature of the vessel was adjusted to 20° C. Then, 110 g of a 20 mass % ammonium carbonate aqueous solution was introduced, followed by stirring at 427 rpm for coagulation to obtain an undried PTFE fine powder (the amount of ammonium carbonate was 3 parts by mass per 100 parts by mass of PTFE). The obtained undried PTFE fine powder was dried at 180° C. for 5 hours to produce the PTFE fine powder. The residual solid content of PTFE in the coagulation waste liquid was less than 0.1 mass %. Further, the average particle size and the bulk density of the obtained PTFE fine powder were 500 μm and 0.51 g/ml, respectively. Further, the standard specific gravity was 2.150. Further, a paste extruded beading was obtained by the measuring method (F), and its extrusion pressure was found to be 17.7 MPa. Further, the tensile strength was measured by the measuring method (G), and its strength and elongation were found to be 39 MPa and 410%, respectively.

Example 8

A PTFE fine powder was produced in the same manner as in Example 7 except that the PTFE emulsion was coagulated by introducing 328.5 g of a 20 mass % ammonium carbonate aqueous solution (the amount of ammonium carbonate was 9 parts by mass per 100 parts by mass of PTFE). The residual solid content of PTFE in the coagulation waste liquid was less than 0.1 mass %. Further, the average particle size and the bulk density of the obtained PTFE fine powder were 430 μm and 0.51 g/ml, respectively. Further, a paste extruded beading was obtained by the measuring method (F), and its extrusion pressure was found to be 17.5 MPa.

Example 9

A PTFE fine powder was produced in the same manner as in Example 7 except that the PTFE aqueous solution was coagulated by introducing 88 g of a 25 mass % ammonium aqueous solution (the amount of ammonium was 3 parts by mass per 100 parts by mass of PTFE) instead of the ammonium carbonate aqueous solution. The average particle size and the bulk density of the obtained PTFE fine powder were 560 μm and 0.47 g/ml, respectively. Further, a paste extruded beading was obtained by the measuring method (F), and its extrusion pressure was found to be 16.7 MPa.

Example 10

A PTFE fine powder was produced in the same manner as in Example 7 except that the PTFE aqueous solution was coagulated by introducing 110 g of a 20 mass % urea aqueous solution (the amount of urea was 3 parts by mass per 100 parts by mass of PTFE) instead of the ammonium carbonate aqueous solution. The residual solid content of PTFE in the coagulation waste liquid was 0.4 mass %. Further, the average particle size and the bulk density of the obtained PTFE fine powder were 570 μm and 0.49 g/ml, respectively. Further, a paste extruded beading was obtained by the measuring method (F), and its extrusion pressure was found to be 16.5 MPa.

Comparative Example 4

A PTFE fine powder was produced in the same manner as in Example 7 except that the PTFE emulsion was coagulated without adding ammonium carbonate. The residual sold content of PTFE in the coagulation waste liquid was 0.4 mass %. Further, the average particle size and the bulk density of the obtained PTFE fine powder were 560 μm and 0.51 g/ml, respectively. Further, the standard specific gravity was 2.150. Further, a paste extruded beading was obtained by the measuring method (F), and its extrusion pressure was found to be 18.1 MPa. Comparing to Example 9, its extrusion pressure was higher by 1.6 MPa. Further, the tensile strength was measured by the measuring method (G), and its strength and elongation were found to be 41 MPa and 410%, respectively.

The above-described experimental results of Examples 1 to 10 and Comparative Examples 1 to 4 are shown in Table 1.

TABLE 1

| | Ex. 1 | Ex. 2 | Ex. 3 | Comp. Ex. 1 | Comp. Ex. 2 | Comp. Ex. 3 | Ex. 4 |
|---|---|---|---|---|---|---|---|
| Fluorinated surfactant | APFO | APFO | APFO | APFO | APFO | APFO | APFO |
| Ammonium carbonate (parts/PTFE) | 3 | 3 | 3 | 0 | 0 | 0 | 0.5 |

TABLE 1-continued

| | | | | | | | |
|---|---|---|---|---|---|---|---|
| Ammonia water (25%) (parts/PTFE) | — | — | — | — | — | — | — |
| Urea (parts/PTFE) | — | — | — | — | — | — | — |
| Solid content in waste liquid (%) | At most 0.1 | — | — | 0.4 | — | — | At most 0.1 |
| Drying temperature (° C.) | 180 | 150 | 120 | 180 | 150 | 120 | 180 |
| Drying time (hr) | 5 | 6.5 | 8 | 5 | 6.5 | 8 | 5 |
| Average particle size (µm) | 410 | — | — | 440 | — | — | 430 |
| Bulk density (g/ml) | 0.46 | — | — | 0.50 | — | — | 0.48 |
| Extrusion pressure (MPa) | 16.3 | 14.8 | 12.7 | 18.1 | 16.3 | 13.2 | 16.5 |
| SSG | 2,150 | — | — | 2,150 | — | — | — |
| Strength (MPa) | 43 | — | — | 39 | — | — | — |
| Elongation (%) | 430 | — | — | 400 | — | — | — |

| | Ex. 5 | Ex. 6 | Ex. 7 | Ex. 8 | Ex. 9 | Ex. 10 | Comp. Ex. 4 |
|---|---|---|---|---|---|---|---|
| Fluorinated surfactant | APFO | APFO | APFDO | APFDO | APFDO | APFDO | APFDO |
| Ammonium carbonate (parts/PTFE) | 1 | 9 | 3 | 9 | — | — | 0 |
| Ammonia water (25%) (parts/PTFE) | — | — | — | — | 12 | — | — |
| Urea (parts/PTFE) | — | — | — | — | — | 3 | — |
| Solid content in waste liquid (%) | At most 0.1 | — | At most 0.1 | At most 0.1 | — | — | 0.4 |
| Drying temperature (° C.) | 180 | 180 | 180 | 180 | 180 | 180 | 180 |
| Drying time (hr) | 5 | 5 | 5 | 5 | 5 | 5 | 5 |
| Average particle size (µm) | 450 | — | 500 | 430 | 560 | 570 | 560 |
| Bulk density (g/ml) | 0.46 | — | 0.51 | 0.51 | 0.47 | 0.49 | 0.51 |
| Extrusion pressure (MPa) | 16.4 | 16.2 | 17.7 | 17.5 | 16.7 | 16.5 | 18.1 |
| SSG | — | — | 2,150 | — | — | — | 2,150 |
| Strength (MPa) | — | — | 39 | — | — | — | 41 |
| Elongation (%) | — | — | 410 | — | — | — | 410 |

INDUSTRIAL APPLICABILITY

The PTFE fine powder produced by the production method of the present invention has a low paste extrusion pressure property, and it is therefore suitable for production of tubes having wide width and various bore diameters, green tapes, porous films and sheets. Further, it is possible to improve various properties of molded articles such as sliding materials in which pigments or fillers are blended, or sealing materials, prepared by the PTFE fine powder, such being industrially useful.

The entire disclosure of Japanese Patent Application No. 2008-132657 filed on May 21, 2008 including specification, claims and summary is incorporated herein by reference in its entirety.

What is claimed is:

1. A method for producing a polytetrafluoroethylene fine powder, which comprises emulsion polymerizing tetrafluoroethylene in the presence of an aqueous medium, a fluorinated surfactant and a radical polymerization initiator, to produce an aqueous polytetrafluoroethylene emulsion, and coagulating the emulsion in the presence of at least one bulk density-reducing compound selected from the group consisting of ammonium carbonate and ammonium hydrogencarbonate in an amount of from 0.4 to 10 parts by mass per 100 parts by mass of polytetrafluoroethylen,
   wherein the polytetrafluoroethylene fine powder produced is non-melt-moldable, has a standard specific gravity of from 2.140 to 2.150 and has a paste extrusion pressure of from 12 to 20 MPa.

2. The method for producing a polytetrafluoroethylene fine powder according to claim 1, wherein the aqueous medium consists of water.

3. The method for producing a polytetrafluoroethylene fine powder according to claim 1, wherein the radical polymerization initiator is at least one member selected from the group consisting of a water-soluble radical initiator, a water-soluble oxidation-reduction catalyst or an oil-soluble radical polymerization initiator.

4. The method for producing a polytetrafluoroethylene fine powder according to claim 1, wherein the bulk density-reducing compound is ammonium carbonate.

5. The method for producing a polytetrafluoroethylene fine powder according to claim 1, wherein the fluorinated surfactant is at least one member selected from the group consisting of a fluorinated carboxylic acid having from 1 to 4 etheric oxygen atoms in the molecule and salts thereof, a perfluoroalkylcarboxylic acid and salts thereof, a ω-hydroperfluoroalkylcarboxylic acid and salts thereof, and a fluorinated sulfonic acid and salts thereof.

6. The method for producing a polytetrafluoroethylene fine powder according to claim 5, wherein the number of carbon atoms constituting the fluorinated surfactant is from 4 to 10.

7. The method for producing a polytetrafluoroethylene fine powder according to claim 1, wherein the amounts of the aqueous medium, the fluorinated surfactant and the radical polymerization initiator to be used for the emulsion polymerization are from 120 to 900 parts by mass, from 0.15 to 2.0 parts by mass and from 0.01 to 0.20 parts by mass, per 100 parts by mass of polytetrafluoroethylene, respectively.

8. The method for producing a polytetrafluoroethylene fine powder according to claim 1, wherein the amount of the bulk density-reducing compound is from 0.5 to 9 parts by mass per 100 parts by mass of polytetrafluoroethylene.

9. The method for producing a polytetrafluoroethylene fine powder according to claim 1, wherein conditions for the emulsion polymerization are such that the polymerization temperature is from 10 to 95° C., the polymerization pressure (gauge pressure) is from 0.5 to 4.0 MPa and the polymerization time is from 90 to 520 minutes.

10. The method for producing a polytetrafluoroethylene fine powder according to claim 1, wherein the polytetrafluoroethylene fine powder is a polytetrafluoroethylene homopolymer fine powder.

\* \* \* \* \*